(12) United States Patent
Gullentops et al.

(10) Patent No.: US 8,705,144 B2
(45) Date of Patent: Apr. 22, 2014

(54) IMAGE PROCESSING METHOD FOR THREE-DIMENSIONAL PRINTING

(75) Inventors: Chris Gullentops, Kessel-Lo (BE); Rudi Lenders, Hoboken (BE)

(73) Assignee: Agfa Graphics NV, Mortsel (BE)

( * ) Notice: Subject to any disclaimer, the term of this patent is extended or adjusted under 35 U.S.C. 154(b) by 332 days.

(21) Appl. No.: 13/140,440

(22) PCT Filed: Dec. 1, 2009

(86) PCT No.: PCT/EP2009/066141
§ 371 (c)(1),
(2), (4) Date: Jun. 17, 2011

(87) PCT Pub. No.: WO2010/079017
PCT Pub. Date: Jul. 15, 2010

(65) Prior Publication Data
US 2011/0249048 A1  Oct. 13, 2011

Related U.S. Application Data

(60) Provisional application No. 61/139,640, filed on Dec. 22, 2008.

(30) Foreign Application Priority Data

Dec. 19, 2008  (EP) .................................. 08172280

(51) Int. Cl.
*H04N 1/40*  (2006.01)
(52) U.S. Cl.
USPC .............................. 358/3.3; 358/1.7; 358/3.09
(58) Field of Classification Search
USPC .................. 358/3.06–3.09, 1.7–1.9, 2.1, 3.3; 382/151; 118/679, 669, 667, 677, 300
See application file for complete search history.

(56) References Cited

U.S. PATENT DOCUMENTS

| | | | |
|---|---|---|---|
| 7,057,773 B2 * | 6/2006 | Ilbery | 358/3.05 |
| 7,706,448 B2 * | 4/2010 | Varma | 375/240.23 |
| 7,706,610 B2 * | 4/2010 | Zhang et al. | 382/173 |
| 8,139,884 B2 * | 3/2012 | Chien et al. | 382/255 |
| 2004/0261700 A1 | 12/2004 | Edwards et al. | |
| 2007/0133864 A1 | 6/2007 | Morimoto | |

FOREIGN PATENT DOCUMENTS

EP  0 952 548 A2  10/1999
EP  1 428 666 A1  6/2004
(Continued)

OTHER PUBLICATIONS

Official Communication issued in International Patent Application No. PCT/EP2009/066141, mailed on Jul. 22, 2010.

(Continued)

*Primary Examiner* — Vincent Rudolph
*Assistant Examiner* — Stephen M Brinich
(74) *Attorney, Agent, or Firm* — Keating & Bennett, LLP

(57) ABSTRACT

A relief print master is created by printing a sequence of layers on top of each other by an inkjet printing system. The top layer corresponds with the binary halftoned image that is to be printed by the print master and the lower intermediate layers are supporting layers. The features in a lower supporting layer have an area that is larger than the corresponding features in a higher supporting layer. A circular spread function is applied on the features of a higher intermediate layer to increase the area of the features in a lower intermediate layer. By using a sequence of two non-circular spread functions, the circular spread function is approximated and the number of required calculations can be reduced.

8 Claims, 5 Drawing Sheets

(56) References Cited

FOREIGN PATENT DOCUMENTS

| | | |
|---|---|---|
| EP | 1 437 882 A1 | 7/2004 |
| EP | 1 857 275 A1 | 11/2007 |
| WO | 01/27697 A1 | 4/2001 |

OTHER PUBLICATIONS

Gullentops et al., "Method for Reducing Image Quality Artifacts in Three-Dimensional Printing," U.S. Appl. No. 13/140,437, filed Jun. 17, 2011.

* cited by examiner

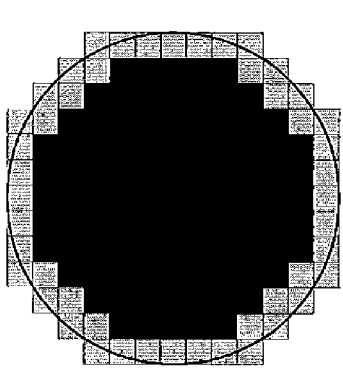
FIG. 12G
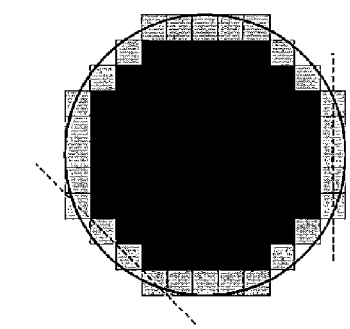
FIG. 12F
FIG. 12E
FIG. 12D

FIG. 12B
FIG. 12C
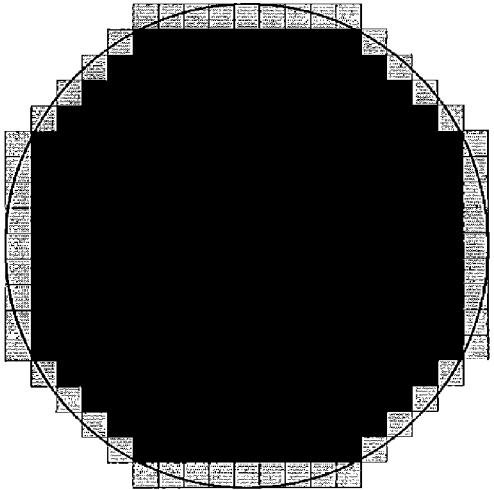
FIG. 12J
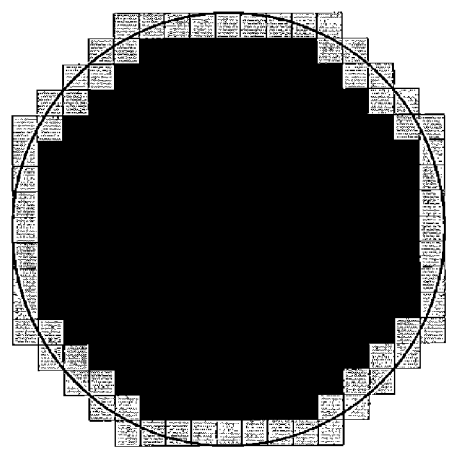
FIG. 12I
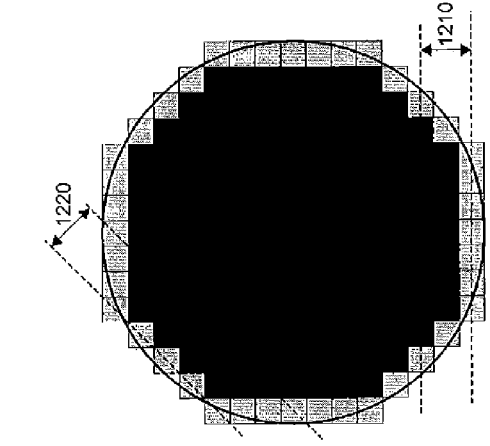
FIG. 12H

IMAGE PROCESSING METHOD FOR THREE-DIMENSIONAL PRINTING

CROSS-REFERENCE TO RELATED APPLICATIONS

This application is a 371 National Stage Application of PCT/EP2009/066141, filed Dec. 1, 2009. This application claims the benefit of U.S. Provisional Application No. 61/139,640, filed Dec. 22, 2008, which is incorporated by reference herein in its entirety. In addition, this application claims the benefit of European Application No. 08172280.3, filed Dec. 19, 2008, which is also incorporated by reference herein in its entirety.

BACKGROUND OF THE INVENTION

1. Field of the Invention

The present invention relates to the domain of image processing methods. It concerns a method for approximating a circular spread function in a computationally efficient way. It can be used in image processing for printing three-dimensional objects by means of for example inkjet printing. The method is particularly suited for the case where the three-dimensional object is a three-dimensional relief print master. Such a print master is created by calculating a plurality of intermediate image layers using the invented method and printing these layers on top of each other.

The present invention also relates to a corresponding apparatus. Such an apparatus may be used for a wide array of applications, for example for the manufacture of stamps, flexographic, letterpress or gravure print masters.

2. Description of the Related Art

Three-dimensional printing is a method for creating three-dimensional objects by depositing or forming thin layers of material in succession on top of each other so as to build up the desired three-dimensional structure. It is sometimes called "Rapid Prototyping and Manufacturing" (RP&M).

Various methods have been devised to create the thin layers.

One technique makes use of a bath of polymerisable liquid material. A thin upper layer of the liquid is cross-linked or hardened in some way, e.g. via laser light in a pattern which is the same as a cross-section through the object to be formed. The laser spot is moved across the surface in accordance with a digital representation of the relevant cross section. After one layer is completed, the liquid level is raised over a small distance and the process is repeated. Each polymerised layer should be sufficiently form-stable to support the next layer.

In another technique powder is dusted onto a substrate and the powder is coalesced by some means, e.g. by heating or by the use of a liquid hardener, in accordance with the shape of the cross-section of the object to be formed.

In yet another method, cross linkable or hardenable material is deposited in the form of drops which are deposited in a pattern according to the relevant cross-section of the object to be formed.

Still another method involves dispensing drops of molten material at an elevated temperature which then solidify on contact with the cooler work piece.

There are many items which can be reproduced by three-dimensional printing. Due to the fact that the materials used to form the object are subject to many limitations and are generally polymeric in nature, the final product is not very strong. Therefore three-dimensional printing is usually reserved for prototyping, for example to create a product design which can be handled or even tested for certain properties.

More information on rapid prototyping, three-dimensional printing, additive fabrication, tooling, and rapid manufacturing is also found in the Wohlers Report 2008, edited and published by Wohlers Associates, Inc., OakRidge Business Park 1511 River Oak Drive in Fort Collins, Colo. 80525 USA.

Printing plates (also referred to as print masters or print forms) are traditionally manufactured using a combination of image wise exposure by a laser or light source followed by a chemical or physical developing step. Such plates are used in a variety of printing methods, such as flexographic printing, letterpress, offset or gravure printing.

Flexographic printing or flexography is a printing process where a flexible print master transfers a fast drying fluid to the printable substrate. The print master can be a flexible plate mounted on a cylinder or a cylindrical sleeve. Flexographic printing plates have the features that define the image that is to be printed in relief, which means that the ink printing area is raised relative to the non ink printing area. The result is a relief plate that is capable of transferring ink from an anilox roll to a substrate. An advantage of flexographic printing is that almost any material that can run through a web press can be printed on in this way, including hard surfaced material such as acetate and other plastic films. Flexography has also been known as "aniline" printing because of the aniline dye inks that were originally used in the process.

Letterpress is a printing process where the image is raised as well and inked to produce an impression.

Offset printing is a method of printing in which the image is not printed directly from a plate, but is offset onto a cylinder which performs the actual printing operation. The printing plate generally has image-selective hydrophobic regions on a hydrophilic background.

Gravure printing is a printing process where the image is etched into a plate or cylinder in the form of recesses or wells. These recesses or wells are filled with ink and the remaining surface is wiped off, thus leaving the ink only in the recesses or wells. The image can then be printed off e.g. onto an absorbent material such as paper.

There are several additional methods of transferring an image from a printing plate onto the printing medium. For instance in tampon printing, a plate comprising an image in relief (or a negative image as in gravure printing) is inked. Afterwards, ink is transferred to a soft tampon printing head by contacting the tampon surface with the inked image. The tampon is then used to print another object, e.g. an object with an irregular surface.

Except in offset printing, relief print masters are used which comprise a substrate with raised parts and recesses. In some of the printing methods such as in flexography and letterpress, the raised parts are used for forming the image, while in gravure printing the recesses form the image. In tampon printing either can be used.

The smallest individual raised portions on a flexographic printing plate are particularly vulnerable to damage. One form of damage is Euler buckling. Euler buckling is the buckling of a thin column into a bow-like or wave-like shape. Assuming a raised portion of a flexographic printing plate has a cylindrical shape having a height H and a diameter d, the critical load which can be applied before buckling is initiated varies approximately as:

$$P_{CR} = \frac{\pi^2 * E * I}{L^2} \qquad (1)$$

wherein E is Young's modulus and I is the moment of inertia. For a quadratic cross section, the value of I is proportional to the cube of the thickness, so the danger of mechanical failure increases as a fast function of the reduction in thickness of a protrusion. Confirmation of this fact can be found in that it has been known in the flexographic industry that small dots on flexographic printing plates tend to break off or wear easily, resulting in discontinuities in tone gradation near the highlights.

Gravure rolls are manufactured by an expensive and time consuming etching process or by means of a diamond stylus which embosses a gravure roll.

European patent application with publication number EP 1 428 666 by Verhoest et al teaches making a flexographic printing plate using an inkjet apparatus. The plate is formed by applying subsequently on a substrate at least two imagewise layers of polymerisable ink by an inkjet printer. Between the application of the first and second layers, the first layer is immobilized by initiating a polymerization of the ink using a UV source.

European patent application with publication number EP 1 437 882 by Delabastita et al teaches an image processing method for creating a three dimensional print master. According to the invention a binary digital image represents the printing surface of a flexographic printing plate. A topographic operator, such as a circular symmetric smoothing filter, is applied on this binary halftone image resulting in a contone image of which the densities represent the heights of a relief print master. The contone image is then conceptually sliced to obtain intermediate binary layers which, when printed on top of each other, form a three-dimensional print master. The effect of the smoothing filter is that around each pixel in an upper intermediate layer a circle of identical pixels is replicated in a lower intermediate layer. As a result, every lower intermediate layer always entirely supports any upper intermediate layer.

One problem with the latter technique is that it requires many computations. It is therefore desirable to come up with a method to calculate the intermediate layers in a way that requires fewer calculations.

SUMMARY OF THE INVENTION

A method according to a preferred embodiment of the current invention takes advantage of the observation that exact shape of the intermediate layers for creating a three-dimensional print master is not very important as long as the condition is fulfilled that every lower intermediate layer supports the higher intermediate layers.

This observation enables to use a calculation method that only approximates a circular spread function (as results from using a circular symmetric smoothing filter in the Delabastita method).

A method according to a preferred embodiment of the current invention starts from the binary halftone bitmap in which pixels that are to print ink have a first color and pixels that are not to print ink have a second color. The method applies in a first step a first spread function on the pixels having the first color to obtain a first intermediate bitmap.

Such a first spread function consists for example of adding to a pixel having the first color additional pixels having a same color to the left, right, bottom and top of the original pixel. A first intermediary bitmap is obtained by applying this first spread function to all the pixels of the bitmap having the first color and making the union of the results.

Such an operation, which essentially consists of four times replicating pixels having the first color in the horizontal and vertical directions can be computationally efficiently implemented, for example using a GPU ("Graphics Processing Unit").

In a second step a second spread function, different from the first spread function is applied on the first intermediate bitmap to obtain a second intermediate bitmap.

A second spread function consists for example of adding to a pixel having the first color an additional pixel having the same color to the left, right, bottom, top and along the four diagonal directions of the original pixel. By applying this second spread function to all the pixels having the first color and making the union of the result, a second intermediary bitmap is obtained.

Just like the first spread function, the second spread function can be efficiently implemented using a GPU.

This process of applying alternately a first and a second spread function on a previous intermediate bitmap is repeated as often as necessary. Every subsequent intermediate bitmap is slightly larger than a previous intermediate bitmap and is hence capable of supporting it.

It was surprisingly found that by proper selection of a first and second spread function, the circular spread function that results from the Delabastita method is sufficiently approximated for printing a three-dimensional print master such as a flexographic print master.

Besides a method for calculating intermediate bitmaps, the current invention also includes a data processing system for calculating the intermediate bitmaps and a method and an apparatus for printing the intermediate bitmaps to form a print master.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12A to FIG. 12J show a sequence of intermediate bitmaps for forming intermediate layers to create a relief print master according to the current invention.

DETAILED DESCRIPTION OF THE PREFERRED EMBODIMENTS

Figure 1:
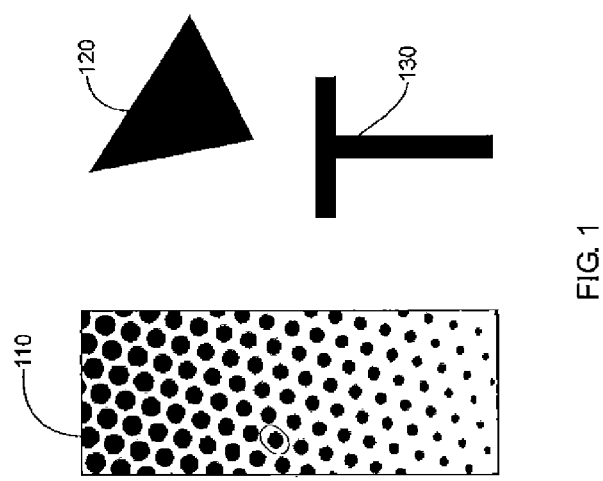
FIG. 1 shows a halftoned image object, a text object and a graphic object.

The drawings in the figures are for explanatory purposes only. The different parts in the drawings are not necessarily using consistent scales.

Rendering of a Digital Image

The image that is to be printed can be any digital image that can be represented as a raster bitmap.

A typical image comprises multiple objects such as photographs, graphic objects such as polygons and line work and text objects.

These objects are usually generated using a page description language and are rendered into a digital image by a raster image processor (RIP) such as made available by the company Adobe Systems Incorporated.

The image can be monochrome or color. In the latter case, the color image is first separated into a set of ink separations that correspond with a set of corresponding printing inks.

Halftoning refers to an image processing technique for rendering images having multiple densities on a rendering system with a restricted density resolution. For example, a digital image has pixels with a density resolution of 8 bits (256 shades) and is rendered on a binary printing system having only two shades of density corresponding with ink or no ink.

A binary halftoned image is represented by a halftone bitmap in which the color of every bit indicates whether ink or no ink is to printed at the corresponding location.

Halftoning can be AM (amplitude modulation), FM (frequency modulation) or XM (hybrid halftoning).

In AM halftoning, the grid points of a periodical grid contain clusters of pixels ("halftone dots") of which the sizes are modulated to simulate different densities in the digital image. An example of a moirë free AM halftoning method for color images is disclosed in the U.S. Pat. No. 5,155,599 invented by Delabastita and assigned to Agfa-Graphic NV. FIG. 1 shows an example of a degrade that has been rendered with AM screening.

In FM screening, the distance between fixed sized halftone dots is varied to simulate different densities. An example of an FM screening method particularly suitable for creating print masters with ink jet is disclosed in U.S. Pat. No. 6,962,400 invented by Minnebo et al. and assigned to Agfa-Graphics NV.

Hybrid screening is a mixed form of AM and FM halftoning in which a combination is used of different halftone dot sizes and distances to modulate densities in the original digital image. An example of hybrid screening is the "Sublima XM screening" product manufactured and marketed by Agfa-Graphics NV.

Whereas a preferred embodiment of the current invention uses AM or XM screening, it can just as well be used in combination with FM screening.

FIG. 1 shows an example of a binary halftoned bitmap comprising a AM halftoned image object 110, a solid graphic object 120 and a solid text object 130.

Print Master

In a preferred embodiment of the current invention, the print master is a positive print master such as a letterpress or a flexographic print master.

Optionally it can be a negative print master, in which case the ink is contained in wells with reference to its top surface. An example is a gravure print master or a negative tampon print master.

Figure 2:
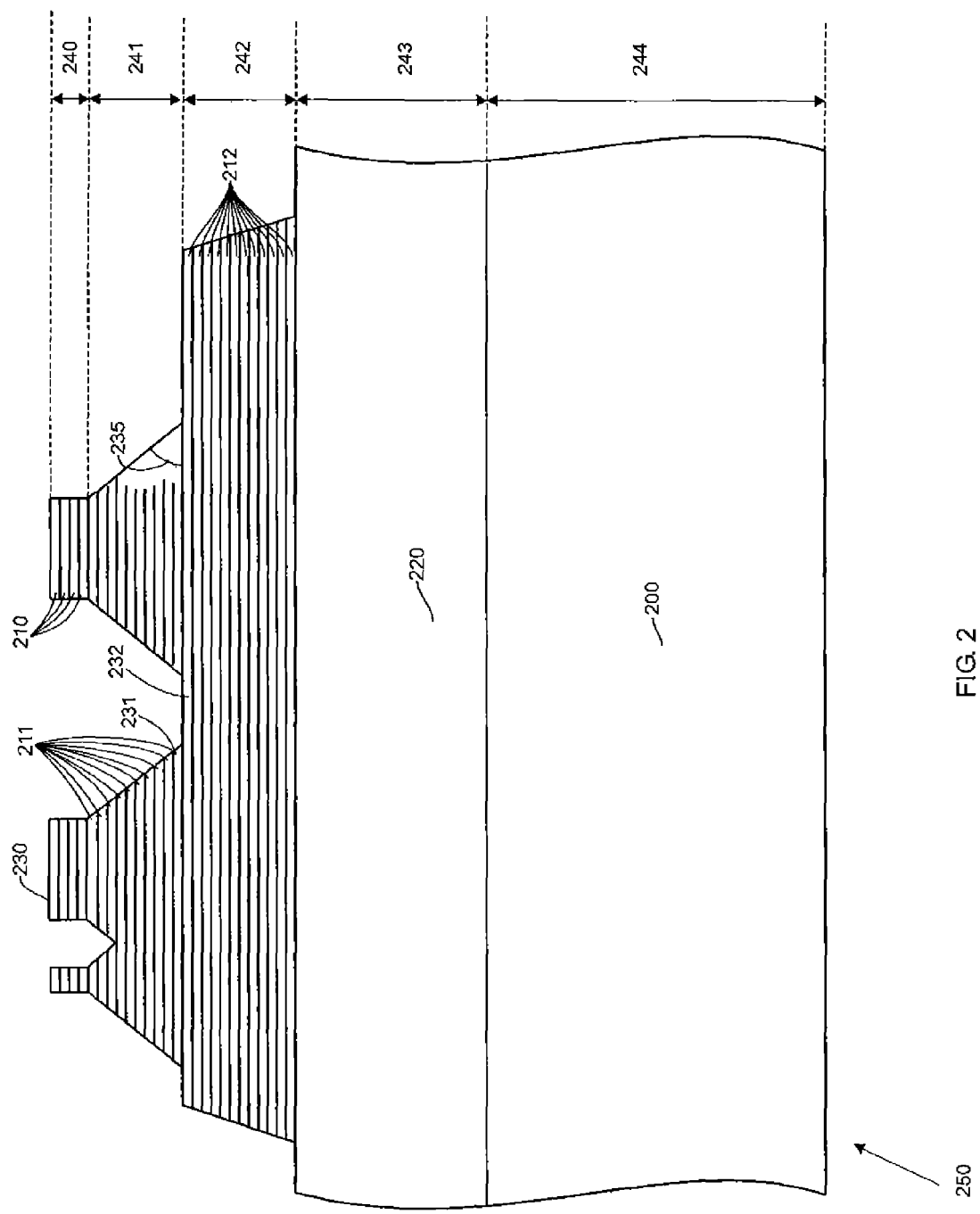
FIG. 2 shows a cross section of a relief print master created by using a preferred embodiment of the current invention.

FIG. 2 shows a cross section of a print master created with a system according to a preferred embodiment of the current invention.

Figure 3:
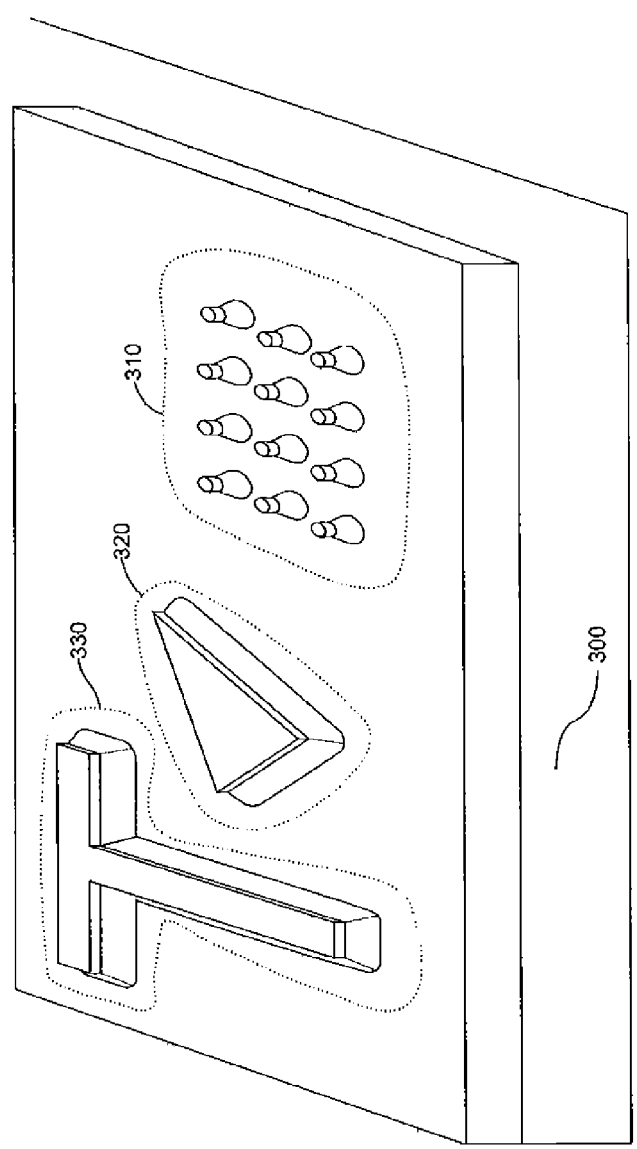
FIG. 3 shows a perspective view of a relief print master created by using a preferred method according to the current invention for printing a halftoned image object, a text object and a graphic object.

FIG. 3 shows a perspective view of a relief print master comprising a halftoned image object 310, a graphic object 320 and a text object 330.

Flexographic Printing Supports

Two forms of flexographic printing supports 200 can be distinguished: a sheet form and a cylindrical form (sleeve). If the print master is created as a sheet form on a flatbed inkjet device (such as the one shown in FIG. 9), the mounting of the sheet form on a sleeve introduces mechanical distortions that show up as anamorphic distortion in the printed image. This distortion is preferably compensated by an anamorphic pre-compensation in an image processing step prior to halftoning.

Creating the print master on a sleeve, either on a sheet form mounted on the sleeve or directly on a sleeve, for example a seamless sleeve, avoids the problem of geometric distortion altogether. Therefore sleeve forms provide improved registration accuracy and faster change over time on press. Furthermore, sleeves may be well-suited for mounting on an inkjet printer having a rotatable drum. In FIG. 2, a support 200 provides the necessary strength and dimensional stability for handling and mounting the print master. Seamless sleeves have applications in the flexographic printing of continuous designs such as in wallpaper, decoration, gift wrapping paper and packaging.

The term "flexographic printing support", as used in the preferred embodiments of the present invention, encompasses two types of support:

1) a support without elastomeric layers on its surface; and 2) a support with one or more elastomeric layers on its surface.

In a preferred embodiment, the flexographic printing support is a sleeve, which encompasses a basic sleeve and a flexographic printing sleeve.

The term "basic sleeve" means a sleeve without elastomeric layers on its outer surface, while the term "flexographic printing sleeve" means a basic sleeve having one or more elastomeric layers on its outer surface.

Although here below the type of materials, the wall thicknesses, . . . are written for sleeves, the same type of materials, wall thicknesses, . . . can be used for flexographic printing supports having a sheet form.

Basic Sleeves

The basic sleeve can be any material that is conventionally used to prepare flexographic printing masters. For good printing results, a dimensionally stable support is required. Basic sleeves, often also called a sleeve base, ordinarily consist of composites, such as epoxy or polyester resins reinforced with glass fibre or carbon fibre mesh. Metals, such as steel, aluminium, copper and nickel, and hard polyurethane surfaces (e.g. durometer 75 Shore D) can also be used.

The sleeve may be formed from a single layer or multiple layers of flexible material, as for example disclosed by US 2002/0046668 (ROSSINI). Flexible sleeves made of polymeric films can be transparent to ultraviolet radiation and thereby accommodate backflash exposure for building a floor in the cylindrical printing element. Multiple layered sleeves may include an adhesive layer or tape between the layers of flexible material. Preferred is a multiple layered sleeve as disclosed in U.S. Pat. No. 5,301,610 (DU PONT). The sleeve may also be made of non-transparent, actinic radiation blocking materials, such as nickel or glass epoxy.

Depending upon the type of tubing and the number of layers of mesh applied, the wall thickness of these sleeve bases varies. The sleeve typically has a wall thickness from 0.1 to 1.5 mm for thin sleeves and from 2 mm to as high as 100 mm for other sleeves.

For thick sleeves often combinations of a hard polyurethane surface with a low-density polyurethane foam as an intermediate layer combined with a fiberglass reinforced composite core are used as well as sleeves with a highly compressible surface present on a sleeve base.

Depending upon the specific application, sleeve bases may be conical or cylindrical. Cylindrical sleeve bases are used primarily in flexographic printing.

As press speeds have increased, press bounce has become a more frequent problem. Various approaches can be taken to reduce press bounce, including the use of cushioned sleeves. Sleeves come in different constructions, e.g. with a hard or a compressible core or surface, with varying wall thicknesses.

The basic sleeve or flexographic printing sleeve is stabilized by fitting it over a steel roll core known as an air mandrel or air cylinder. Air mandrels are hollow steel cores which can be pressurized with compressed air through a threaded inlet in the end plate wall. Small holes drilled in the cylindrical wall serve as air outlets. The introduction of air under high pressure permits it to float into position over an air cushion. Certain thin sleeves are also expanded slightly by the compressed air application, thereby facilitating the gliding movement of the sleeve over the roll core.

Foamed adapter or bridge sleeves are used to "bridge" the difference in diameter between the air-cylinder and a flexographic printing sleeve containing the printing relief. The diameter of a sleeve depends upon the required repeat length of the printing job.

Flexographic Printing Sleeves

A flexographic printing sleeve is a basic sleeve provided with one or more elastomeric layers. The elastomeric layers may be any material that is conventionally used to prepare flexographic printing masters. The elastomeric layers are preferably partially or fully cured photopolymer layers, but can also be rubber or polyurethane layers. It is also possible to use a partially or fully cured conventional UV exposure flexographic printing form precursor as flexographic printing sleeve. A wide variety of such conventional flexographic printing form precursors are commercially available.

A printing relief can be formed in several ways on the flexographic printing sleeve. In a preferred embodiment the relief is formed by inkjet printing on the one or more elastomeric layers already present as an "elastomeric floor 220". In the latter, the one or more elastomeric layers are preferably partially cured layers to enhance the adhesion of the relief jetted onto the elastomeric layers. Alternatively the elastomeric floor may also be applied to the surface of the basic sleeve by inkjet printing.

In another preferred embodiment, the elastomeric layers are fully cured and the relief is formed by laser engraving. In laser engraving, the elastomeric layers of a different hardness can be used to obtain the desired hardness.

In another preferred embodiment the flexographic printing sleeve is prepared by a coating method as disclosed in WO 2008/034810 (AGFA GRAPHICS).

Different types of printing applications require flexographic printing forms with differing degrees of hardness. Softer flexographic printing forms are more suited for rough substrates because they can better cover the highs and lows. The harder flexographic printing forms are used for even and smooth substrates. The optimum hardness of a flexographic printing form also depends on whether the image is solid or halftone. Softer flexographic printing forms will transfer the ink better in solid areas, though harder flexographic printing forms have less dot gain. The hardness is a measure of the printing form's mechanical properties which is measured in degree of Shore A. For example, printing on corrugated board requires usually a hardness of 35° Shore A, whereas for reel presses 65° to 75° Shore A is a standard.

Depending on the substrate to be printed upon, the hardness and thickness of the flexographic printing form have to be adjusted by controlling the amount of the curable liquid that is printed, its composition and its degree of curing. Depending on the application, the relief depth varies from 0.2 to 4 mm, preferably from 0.4 to 2 mm.

In a preferred embodiment of the current invention, a relief is applied by an inkjet printing device by applying imagewise on a support subsequent layers of radiation curable liquid by an inkjet printing device whereby an applied layer is preferably immobilized using a curing device before a subsequent layer is applied. The curing does not have to be a full cure, but can be a partial cure. Optionally some of the layers are not cured directly after jetting the layer, but after jetting of a subsequent layer. In a preferred embodiment, each applied layer is immobilized using the curing device before a subsequent layer is applied.

In a preferred embodiment of the present invention of the method for making a flexographic printing master, the relief includes a so-called "mesa relief" as shown by the flexographic printing master (250) in FIG. 2. The layers (212) together define a "mesa relief". Such a mesa relief is only present in those parts of the flexographic printing master comprising image features such as text, graphics and halftone images. In extended areas where such image features are absent, there is no mesa relief.

A mesa relief preferably has a height (242) in a range from 50 μm to 1 mm, for example 0.5 mm.

The layers (210), (211) and (212) in FIG. 2 define the actual printing relief of the flexographic printing master. The layers (210) and (211) in FIG. 2 define the image relief. The top layer (230) corresponds with a halftone bitmap that defines the image that is to be printed by the printing master. The layers (210) are preferably identical in shape and size as the top layer (230), producing a vertical relief slope and defining a "top hat segment". Such a top hat may have a height (240) between 10 and 500 μm and preferably between 20 and 200 μm. A vertical relief slope for a top hat segment has the advantage that the printing surface (230) remains consistent during printing, even when pressure variations occur between the print master and the anilox roller or between the print master and the printable substrate, or when the printing master wears off.

The intermediate layers (211), together forming a sloped segment, are preferably printed with a slope having an angle (235) that is less than 90 degrees. The angle can be between 25 and 75 degrees, preferably between 40 and 60 degrees, for example 50 degrees. The angle (235) can be controlled by controlling the height (241) of the individual layers, their number and the difference in size between subsequent layers.

Using a lower slope angle (235) has the advantage that small features on the print master will suffer less from buckling. The total height (241) of the intermediate layers (211) is for example between 30 μm and 700 μm, preferably between 50 μm and 250 μm.

In a more preferred embodiment of the current invention, the intermediate layers (210), (211) and (212) are printed in multiple passes with an ink jet printer that jets a radiation curable liquid in combination with a curing device. Each intermediate layer is solidified by a curing device immediately after printing. Especially the upper layer (232) of the mesa relief is preferably only partially cured for ensuring a good adhesion with the lowest intermediate layer (231) of the sloped segment (211). Optionally a final curing step is carried out to further harden the layers after all of them have been printed.

The mesa relief is preferably printed on an elastomeric support floor (220) that provides the necessary resilience to the flexographic printing master. Such an elastomeric floor can, for example, be obtained by layer-wise spraying or jetting a radiation curable liquid on the support and curing the layers with a UV curing source. The height (243) of an elastomeric floor (220) is preferably between 0.3 mm and 2 mm.

The elastomeric floor (220) may itself be supported by a support (200). A support (200) of a sheet form typically has a height (244) from 0.005 to 0.127 cm. A preferred height (244) for the sheet form is 0.007 to 0.040 cm. A sleeve form typically has a wall height (244) from 0.1 to 1 mm for thin sleeves and from 1 to as much as 100 mm for other sleeves. The selection of the height (244) depends upon the application.

First and Second Spread Function

In this part of the text the concepts of a first and a second spread function are elaborated which are of importance in the remainder of the text.

In a preferred embodiment of the current invention, a spread of a binary pixel having a first color on a background having a second color refers to replicating that pixel so that a contiguous cluster of pixels having the same first color surrounds the original pixel. If the spread of a first and a second pixel overlap, the union is taken of both spreads. A spread function defines the spread of a single isolated pixel.

Figure 4:
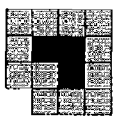
FIG. 4 shows a first spread function.

FIG. 4 shows an example of a first spread function. The "black" pixel is the one having the "first" color and on which the spread is applied. The "grey" pixels are the ones that have been added by the spread and also correspond with the first color (in FIG. 4 they are only rendered in grey to enable to distinguish between the original and added pixels). In the example in FIG. 4, a pixel is replicated to the left, to the right, to the bottom and to the top of the original pixel, i.e. to the four XY directions of the bitmap.

Figure 5:
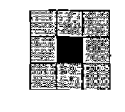
FIG. 5 shows a second spread function different from the first spread function.

FIG. 5 shows an example of a second spread function. In this example a pixel is replicated to the left, to the right, to the bottom and to the top of the original pixel, i.e. to the four XY directions of the bitmap as well to the four diagonal directions.

Figure 6:
FIG. 6 shows a spread of a cluster of pixels using the first spread function.

In FIG. 6 the second spread function is applied on a set of three neighboring pixels having the same first color. Applying the spread on each pixel results in three overlapping pixel clusters of the same first color of which the union is taken. Arithmetically speaking, the effect of the spread of a first pixel is combined with a bitwise logical OR function with the effect of the spread of the other pixels in a bitmap.

Figure 7:
FIG. 7 shows that the spread function in FIG. 4 can be obtained by applying a logical OR operation on a bitmap obtained with a vertical spread function and a bitmap obtained with a horizontal spread function.

FIG. 7 demonstrates a concept for an efficient implementation of the first spread function. The effect of the spread function in FIG. 4 is obtained by applying separately a horizontal spread (HS) and a vertical spread (VS) on the original pixel and using a logical OR function to combine the two results. A horizontal spread of a pixel is efficiently performed by applying a logical OR function to a pixel with its translation to the left and its translation to the right. Such a translation is preferably implemented using unsigned integer arithmetic. In a similar way a vertical spread is efficiently performed. These operations are preferably implemented simultaneously on a group of bits in a bitmap, for example, all the bits in a 16 bit or 32 bit word.

For example, a first eight bit word BM containing eight binary pixels (whereby the most significant bit in the word corresponds with the left most pixel and the least significant bit with the right most pixel) is transformed into a second word BM' by applying a horizontal spread function using the following computer instructions (in meta C computer language and assuming unsigned eight bit arithmetic):

$$BM'=BM \wedge (BM<<1) \wedge (BM>>1) \wedge (0bL0000000) \wedge (0b0000000R)$$

wherein:

$\wedge$ refers to a bitwise logical OR operation on a word $>>1$ refers to a shift to right shift operation of the entire word;

$<<1$ refers to a shift to left shift operation of the entire word;

L refers to the value of the carry over bit resulting from the right shift operation of the left neighbor word;

R refers to the value of the carry over bit resulting from the left shift operation of the right neighbor word.

Figure 8:
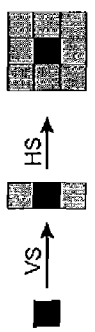
FIG. 8 shows that the spread function in FIG. 5 can be obtained by a sequence of a vertical spread function followed by a horizontal spread function.

As FIG. 8 demonstrates, the second spread function can be very efficiently implemented by applying on a pixel having the first color first a vertical spread (VS), and by subsequently applying on this vertical spread a horizontal spread (HS) or vice versa.

Similarly, a vertical spread function VS is implemented using the following computer instructions:

$$BM'=BM \wedge BMU \wedge BML$$

wherein BMU and BML refer to the words having one position higher and lower than BM in the bitmap.

Calculating the Intermediate Layers 210, 211 and 212

The top layer 230 and intermediate layers 210 correspond with the halftone bitmap. This binary halftoned bitmap is directly obtainable from the raster image processor.

The intermediate layers 211 are obtained by repetitively applying a spread function to the binary halftoned bitmap.

According to a preferred embodiment of the current invention, such a spread function is approximated by subsequently applying a first and a second spread function starting from the digital halftone bitmap This is demonstrated by means of the FIG. 12A to FIG. 12J where the operation is shown for a single bit in the halftone bitmap. It was mentioned before that the same operation should be performed on all the bits of the halftone bitmap and that the results of these operations should be combined by means of a bitwise logical OR operation.

Figure 12A:

According to a first step of a preferred method, a first spread function is applied to a single pixel in FIG. 12A to obtain a first intermediate bitmap comprising a first cluster of pixels in FIG. 12B.

In a second step a second spread function is applied on the first intermediate bitmap in FIG. 12B. This results in a second intermediate bitmap in FIG. 12C.

By repeating the first and second step, a sequence of intermediate bitmaps shown in FIG. 12D to FIG. 12J is obtained.

As the sequence of FIG. 12A to 12J indicates, the clusters in the intermediate bitmaps closely approximate circles. The effect of alternating a first and a second—different—spread function apparently approximates a circular spread function.

Comparing FIG. 12F with FIG. 12H leads to the following observations. The increase 1210 of the radius measured along a horizontal tangent line by applying a first and a second spread function is 2 pixels. The increase 1220 of the radius measured along a 45 degree tangent line by applying a first and a second spread function is $(3/2)*\sqrt{2}=2.12$ pixels. The growth along the 45 degree tangent lines is only 1.06 times larger than the growth along the horizontal and vertical tangent lines and this provides part of the explanation why the sequence of the first and second spread function approximates a circular spread function.

When the sequence of the first and second spread functions is repeated many times, the shape of the combined spread function starts to approximate an octagon and ultimately a square. This however is without effect for creating a print master since the exact shape of the intermediate layers 211 is not relevant as long as a lower intermediate layer completely supports a higher intermediate layer.

The first spread functions shown in FIG. 4 and the second spread function shown in FIG. 5 are preferred embodiments for the current invention. However, a sequence of different spread functions can be used for achieving the same objective. In general any sequence of spread functions can be used that enable efficient computing of intermediate bitmaps and fulfill the requirement that a next intermediate bitmap completely supports a previous intermediate layer.

The intermediate layers that define the mesa relief can be calculated using a variation of the above described technique. In that case the starting point is the lowest intermediate layer 231 of the relief part 211. On this lowest layer 231 a substantial spread, for example of 0.5 mm is applied using the above described techniques, i.e. by applying multiple times a spread function that is approximated by a sequence of a first and a second spread function. This results in an upper layer 232 of the mesa relief. On this upper layer 232 again a spread function is applied to subsequently calculate the lower intermediate layers 212 of the mesa relief.

Creating the Print Master

A print master 250 is created by printing the intermediate bitmaps in the reverse order that they were calculated. This means that first the layers defining the mesa relief are printed from lowest to highest, subsequently the intermediate layers 211 from lowest to highest and finally the layers defining the top hat relief from lowest to highest. The last layer that is to be printed is the top layer 230. For this purpose an apparatus shown in FIG. 9, FIG. 10 or in FIG. 11 can be used.

Figure 9:
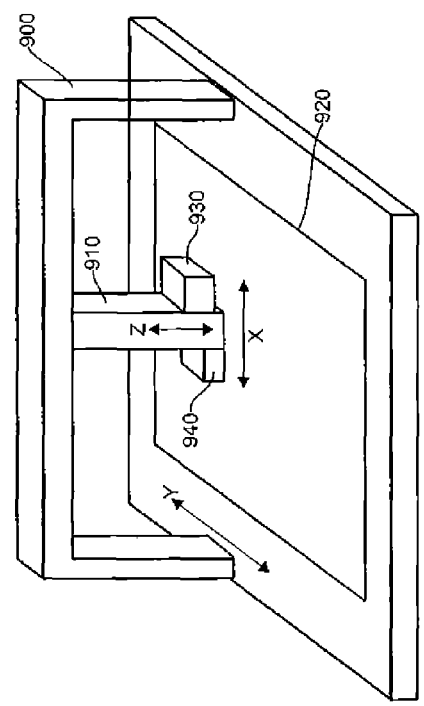
FIG. 9 shows a first preferred embodiment of an apparatus for creating a relief print master according to the current invention.

In FIG. 9 a carriage 900 is mounted so that it can move in a Y direction with regard to a printed substrate 920. On the carriage a print head 910 is mounted that can move in an X direction with regard to a printable substrate 920. Additionally the print head can move in a Z direction perpendicular to the substrate 920.

The print head is coupled to a curing source 930 for curing the printed ink during printing and optionally a laser profilometer 940 for measuring the profile of the printed layers.

The print head scans the printable substrate 920 along the XY dimensions and prints an intermediate bitmap that results in an intermediate layer calculated using a method according to a preferred embodiment of the current invention. During the scan the curing source 930 solidifies the printed ink. The profile meter 940 measures the profile of the printed layers and controls the Z position of the print head.

Figure 10:
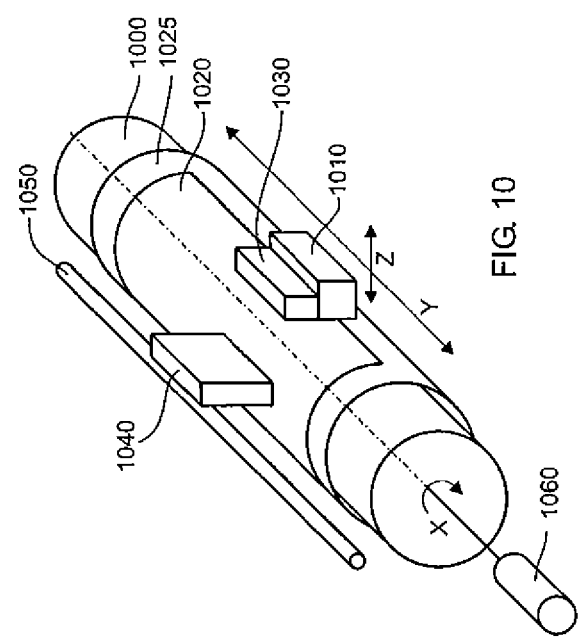
FIG. 10 shows a second preferred embodiment of an apparatus for creating a relief print master according to the current invention.

An alternative preferred embodiment is shown in FIG. 10. A sleeve 1025 is mounted on a drum 1000 that is driven by a motor 1060 in a rotational direction X, which corresponds with a fast scan dimension. The sleeve carries a sheet of support layer 1020.

A printhead 1030 is mounted on a carriage (not shown) that can move in the Y direction parallel to the axle of the drum and which corresponds with a slow scan dimension.

During operation, the combination of the rotation X and translation Y of the printhead enables to print an intermediate bitmap on the substrate. During the printing, partial curing takes place of a printed intermediate layer by the curing source 1010. 1040 is a profile meter to control the distance between the print head and the substrate in a Z direction.

Optionally the printed intermediate layers can be subject to a post curing step by rotating the drum 1000 while a final curing source 1050 is turned on.

Figure 11:
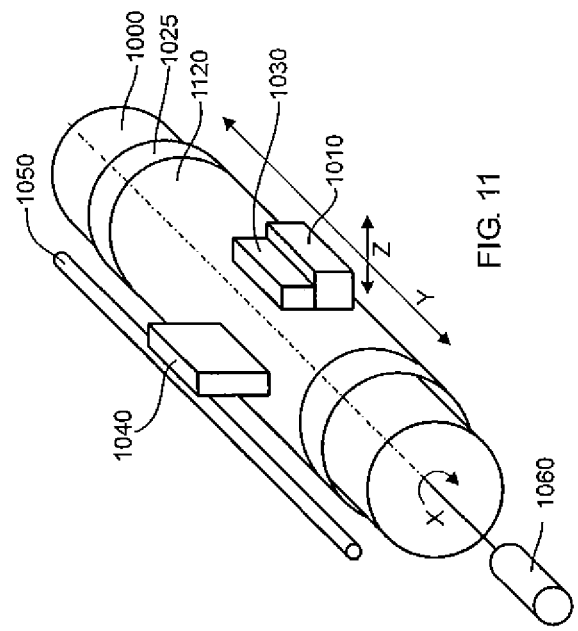
FIG. 11 shows a variation of the second preferred embodiment in which a printing plate is replaced by a printing sleeve.

A variation of the preferred embodiment in FIG. 10 is shown in FIG. 11, except that the support layer 1120 in this case is seamless, which is a preferred embodiment according to the current invention. This set up enables the printing on sleeves in a continuous and seamless fashion, which is a preferred embodiment according to the current invention. According to this preferred embodiment, the position of the printhead 1030 moves linearly in the slow scan dimension Y as a function of the angular rotation of the drum in the X direction. The effect of this is that every nozzle of the printhead describes a continuous and spiral motion relative to a fixed position on the drum Curable Liquid Composition (Ink)

The ink that is used for printing the intermediate layers 210, 211 and 212 is a liquid that is curable by actinic radiation which can be UV light, IR light or visible light. Preferably the radiation curable liquid is a UV curable liquid.

The radiation curable liquid preferably contains at least a photo-initiator and a polymerisable compound. The polymerisable compound can be a monofunctional or polyfunctional monomer, oligomer or pre-polymer or a combination thereof.

The radiation curable liquid may be a cationically curable liquid but is preferably a free radical curable liquid.

The free radical curable liquid preferably contains substantially acrylates rather than methacrylates for obtaining a high flexibility of the applied layer. Also the functionality of the polymerisable compound plays an important role in the flexibility of the applied layer. Preferably a substantial amount of monofunctional monomers and oligomers are used.

In a preferred embodiment of the present invention, the radiation curable liquid includes:

a) a photoinitiator; and
b) a polymerizable compound selected from the group consisting of lauryl acrylate, polyethyleneglycol diacrylate, polyethylene glycol dimethacrylate, 2-(2-ethoxyethoxy) ethyl acrylate, 2-phenoxyethyl acrylate, 2-phenoxyethyl methacrylate, propoxylated neopentylglycol diacrylate, alkoxylated hexanediol diacrylate, isobornylacrylate, isodecyl acrylate, hexane diol diacrylate, caprolacton acrylate and urethane acrylates.

In a more preferred embodiment of the present invention, the radiation curable liquid includes an aliphatic urethane acrylate. Aromatic type urethane acrylates are less preferred.

In an even more preferred embodiment, the urethane acrylate is a urethane monoacrylate. Commercial examples include GENOMER™ 1122 and EBECRYL™ 1039.

The flexibility of a given urethane acrylate can be enhanced by increasing the linear molecular weight between cross links. Polyether type urethane acrylates are for flexibility also more preferred than polyester type urethane acrylates.

Preferably the radiation curable liquid does not include amine modified polyether acrylates which reduce the flexibility of the cured layer.

An elastomer or a plasticizer is preferably present in the radiation curable liquid for improving desired flexographic properties such as flexibility and elongation at break.

The radiation curable liquid may contain a polymerization inhibitor to restrain polymerization by heat or actinic radiation.

The radiation curable liquid may contain at least one surfactant for controlling the spreading of the liquid.

The radiation curable liquid may further contain at least one colorant for increasing contrast of the image on the flexographic print master.

The radiation curable liquid may further contain at least one acid functionalized monomer or oligomer.

The radiation curable liquid preferably has a viscosity at a shear rate of 100 s-1 and at a temperature between 15 and 70° C. of not more than 100 mPa·s, preferably less than 50 mPa·s, and more preferably less than 15 mPa·s.

*Monofunctional Monomers*

Any polymerisable monofunctional monomer commonly known in the art may be employed. Particular preferred polymerisable monofunctional monomers are disclosed in paragraphs [0054] to [0058] of EP 1637926 A (AGFA).

Two or more monofunctional monomers can be used in combination.

The monofunctional monomer preferably has a viscosity smaller than 30 mPa·s at a shear rate of 100 s-1 and at a temperature between 15 and 70° C.

*Polyfunctional Monomers and Oligomers*

Any polymerisable polyfunctional monomer and oligomer commonly known in the art may be employed. Particular preferred polyfunctional monomers and oligomers are disclosed in paragraphs [0059] to [0063] of EP 1637926 A (AGFA).

Two or more polyfunctional monomers and/or oligomers can be used in combination.

The polyfunctional monomer or oligomer preferably has a viscosity larger than 50 mPa·s at a shear rate of 100 s-1 and at a temperature between 15 and 70° C.

*Acid Functionalized Monomers and Oligomers*

Any polymerisable acid functionalized monomer and oligomer commonly known in the art may be employed. Particular preferred acid functionalized monomers and oligomers are disclosed in paragraphs [0066] to [0070] of EP 1637926 A (AGFA).

*Photo-Initiators*

The photo-initiator, upon absorption of actinic radiation, preferably UV-radiation, forms free radicals or cations, i.e. high-energy species inducing polymerization and crosslinking of the monomers and oligomers in the radiation curable liquid.

A preferred amount of photo-initiator is 1 to 10% by weight, more preferably 1 to 7% by weight, of the total radiation curable liquid weight.

A combination of two or more photo-initiators may be used. A photo-initiator system, comprising a photo-initiator and a co-initiator, may also be used. A suitable photo-initiator system comprises a photo-initiator, which upon absorption of actinic radiation forms free radicals by hydrogen abstraction or electron extraction from a second compound, the co-initiator. The co-initiator becomes the actual initiating free radical.

Irradiation with actinic radiation may be realized in two steps, each step using actinic radiation having a different wavelength and/or intensity. In such cases it is preferred to use 2 types of photo-initiators, chosen in function of the different actinic radiation used.

Suitable photo-initiators are disclosed in paragraphs [0077] to [0079] of EP 1637926 A (AGFA).

*Inhibitors*

Suitable polymerization inhibitors include phenol type antioxidants, hindered amine light stabilizers, phosphor type antioxidants, hydroquinone monomethyl ether commonly used in (meth)acrylate monomers, and hydroquinone, methylhydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, SUMILIZER™ GA-80, SUMILIZER™ GM and SUMILIZER™ GS produced by Sumitomo Chemical Co., Ltd.

Since excessive addition of these polymerization inhibitors will lower the sensitivity to curing of the radiation curable liquid, it is preferred that the amount capable of preventing polymerization be determined prior to blending. The amount of a polymerization inhibitor is generally between 200 and 20,000 ppm of the total radiation curable liquid weight.

*Oxygen Inhibition*

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1 [4-(methylthio)phenyl]-2-morpholinopropane-1-on and diethylthioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE™ 800 and ACTILANE™ 725 available from AKZO NOBEL, EBECRYL™ P115 and EBECRYL™ 350 available from UCB CHEMICALS and CD 1012, CRAYNOR™ CN 386 (amine modified acrylate) and CRAYNOR™ CN 501 (amine modified ethoxylated trimethylolpropane triacrylate) available from CRAY VALLEY.

The content of the synergist additive is in the range of 0 to 50% by weight, preferably in the range of 5 to 35% by weight, based on the total weight of the radiation curable liquid.

*Plasticizers*

Plasticizers are usually used to improve the plasticity or to reduce the hardness of adhesives, sealing compounds and coating compositions. Plasticizers are liquid or solid, generally inert organic substances of low vapor pressure.

Suitable Plasticizers are Disclosed in Paragraphs [0086] to [0089] of EP 1637926 A (AGFA).

The amount of plasticizer is preferably at least 5% by weight, more preferably at least 10% by weight, each based on the total weight of the radiation curable liquid.

The plasticizers may have molecular weights up to 30 000 but are preferably liquids having molecular weights of less than 5,000.

*Elastomers*

The elastomer may be a single binder or a mixture of various binders. The elastomeric binder is an elastomeric copolymer of a conjugated diene-type monomer and a polyene monomer having at least two non-conjugated double bonds, or an elastomeric copolymer of a conjugated diene-type monomer, a polyene monomer having at least two non-conjugated double bonds and a vinyl monomer copolymerizable with these monomers.

Preferred elastomers are disclosed in paragraphs [0092] and [0093] of EP 1637926 A (AGFA).

*Surfactants*

The surfactant(s) may be anionic, cationic, non-ionic, or zwitter-ionic and are usually added in a total quantity below 20% by weight, more preferably in a total quantity below 10% by weight, each based on the total radiation curable liquid weight.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates.

*Colorants*

Colorants may be dyes or pigments or a combination thereof. Organic and/or inorganic pigments may be used.

Suitable dyes and pigments include those disclosed by ZOLLINGER, Heinrich. Color Chemistry: Syntheses, Properties, and Applications of Organic Dyes and Pigments. 3rd edition. WILEY-VCH, 2001. ISBN 3906390233. p. 550.

Suitable pigments are disclosed in paragraphs [0098] to [0100] of EP 1637926 A (AGFA).

The pigment is present in the range of 0.01 to 10% by weight, preferably in the range of 0.1 to 5% by weight, each based on the total weight of radiation curable liquid.

*Solvents*

The radiation curable liquid preferably does not contain an evaporable component, but sometimes, it can be advantageous to incorporate an extremely small amount of a solvent to improve adhesion to the ink-receiver surface after UV curing. In this case, the added solvent may be any amount in the range of 0.1 to 10.0% by weight, preferably in the range of 0.1 to 5.0% by weight, each based on the total weight of radiation curable liquid.

*Humectants*

When a solvent is used in the radiation curable liquid, a humectant may be added to prevent the clogging of the nozzle, due to its ability to slow down the evaporation rate of radiation curable liquid.

Suitable humectants are disclosed in paragraph [0105] of EP 1637926 A (AGFA).

A humectant is preferably added to the radiation curable liquid formulation in an amount of 0.01 to 20% by weight of the formulation, more preferably in an amount of 0.1 to 10% by weight of the formulation.

*Biocides*

Suitable biocides include sodium dehydroacetate, 2-phenoxyethanol, sodium benzoate, sodium pyridinethion-1-oxide, ethyl p-hydroxy-benzoate and 1,2-benzisothiazolin-3-one and salts thereof. A preferred biocide for the radiation curable liquid suitable for the method for manufacturing a flexographic print master according to the present invention, is PROXEL™ GXL available from ZENECA COLOURS.

A biocide is preferably added in an amount of 0.001 to 3% by weight, more preferably in an amount of 0.01 to 1.00% by weight, each based on radiation curable liquid.

*Preparation of Radiation Curable Liquids*

The radiation curable liquid may be prepared as known in the art by mixing or dispersing the ingredients together, optionally followed by milling, as described for example in paragraphs [0108] and [0109] of EP 1637926 A (AGFA).

Print Head

An example of a print head according to the current invention is capable to eject droplets having a volume between 0.1 and 100 pl. and preferably between 1 and 30 pl. Even more preferably the droplet volume is in a range between 1 pl and 8 pl. Even more preferably the droplet volume is only 2 or 3 pl.

The dot placement precision with regard to the theoretical addressable print grid is for example less than +/−3 micron in 99.73% (three sigma) of the printed pixels.

The print head has an addressable grid having a square pitch of for example 70 micrometer.

Curing Source

Just after the deposition of ink drops by the print head on the substrate they are exposed by a curing source. This provides immobilization and prevents the droplets to run out, which would deteriorate the quality of the print master.

Curing can be partial or full. A partial cure is defined as a degree of curing wherein at least 5%, preferably 10%, of the functional groups in the coated formulation is converted. A full cure is defined as a degree of curing wherein the increase in the percentage of converted functional groups, with increased exposure to radiation (time and/or dose), is negligible. A full cure corresponds with a conversion percentage that is within 10%, preferably 5%, from the maximum conversion percentage defined by the horizontal asymptote in the RT-FTIR graph (percentage conversion versus curing energy or curing time).

The most important parameters when selecting a curing source are the spectrum and the intensity of the UV-light. Both parameters affect the speed of the curing.

Short wavelength UV light (such from a UV-C source) has poor penetration and enables to cure droplets primarily on the outside.

A typical UV-C light source is low pressure mercury vapor electrical discharge bulb. Such a source has a wide spectral distribution of energy, but with a strong peak in the short wavelength region of the UV spectrum.

Long wavelength UV light (such as from a UV-A source) has better penetration properties. A typical UV-A source is a medium or high pressure mercury vapor electrical discharge bulb. Recently UV-LEDS have become commercially available which also emit in the UV-A spectrum and that have the potential to replace gas discharge bulb UV sources.

By doping the mercury gas in discharge bulb with iron or gallium, an emission can be obtained that covers both the UV-A and the UV-C spectrum.

The effect of the spectrum and intensity of a curing source on curing an ink can also be affected by including dyes in an ink that absorb energy in a part of the spectrum of a curing source.

The intensity of a curing source has a direct effect on curing speed. A high intensity results in higher curing speeds. The curing speed should be sufficiently high to avoid oxygen inhibition of free radicals that propagate during curing. Such inhibition not only decreases curing speed, but also negatively affects the conversion ratio of monomer into polymer.

An intermediate layer 210, 211 and 212 is preferably immediately after having being printed a least partially cured so that the layer is solidified but still contains residual monomer. This approach improves the adhesion properties of layers that are subsequently printed on top of each other.

Partial intermediate curing is possible with UV-C light, UV-A light or with broad spectrum UV light. The use of UV-C light polymerizes the outer skin of an intermediate layer. On the other hand, it reduces the availability of monomer in the outer skin and this negatively impacts the adhesion between subsequent intermediate layers. A better solution therefore exists to provide partial curing with a UV-A source under a nitrogen atmosphere. This solution both suppresses oxygen inhibition and optimizes adhesion between subsequent intermediate layers.

A final post curing is realized with UV-C light or with broad spectrum UV light. Final curing with UV-C light has the property that the outside skin of the print master is fully hardened.

It is important to avoid that light—even stray light—from a curing source reaches the nozzles of a print head, because this would cause the ink to polymerize in the nozzles, causing them to become ineffective. For this reason, a curing source and a print head should be sufficiently space apart, or a screen should be placed in between both. In the set up of FIG. 10, a solution consists of placing the UV curing source for example 180 degrees apart from the print head with regard to the axle of the cylindrical drum.

Building of a Layered Structure, Shingling, Interlacing

When the apparatus shown in FIG. 9 is used, the print master can be created by sequentially printing the intermediate layers.

Printing of the intermediate bitmaps is done layer by layer from the bottom to the top layer.

Because of manufacturing tolerances, the droplet volume, speed and direction may slightly vary between inkjet nozzles. It is well known in two-dimensional printing that in absence of any compensating measures this may lead to correlated image quality artifacts such as banding and streaking.

Banding and streaking artifacts in the intermediate layers are effectively suppressed by means of interlacing and shingling techniques as for example disclosed in the U.S. Pat. No. 6,679,583 assigned to Agfa-Graphics NV. According to the teachings of this patent, pixels on a single row or columns of the image are printed by different nozzles. As a result, the effect of nozzle variation is spatially diffused so that it becomes less noticeable. This effectively suppresses the visibility of banding and streaking.

The droplets that are ejected by a print head have a main velocity component in the Z direction relative to the substrate. However, since the print head during printing also moves in the X direction, the droplets also have a velocity component in that direction. This means that the landing position in the X direction is affected by the distance between the print head and the printable substrate. Because printing an additional layer changes this distance, this effect needs to be compensate for in order to achieve registration between subsequent intermediate layers. A first solution consists of digitally shifting an intermediate bitmap to compensate for the effect. A second solution consists of moving the print head in the Z direction so that the distance between the head and the printable surface remains constant. The distance can be for example be kept constant at 1 mm. For this purpose the profile meter 940 (FIG. 9) or 1040 (FIG. 10) can be used.

The invention claimed is:

1. A method for creating a relief print master for printing a digital image using a series of intermediate bitmaps, the method comprising the steps of:
    calculating a halftone bitmap of the digital image, the halftone bitmap representing a first intermediate bitmap;
        calculating from the first intermediate bitmap a series of intermediate bitmaps by applying a spread function on a previous intermediate bitmap to obtain a next intermediate bitmap; and
    printing the series of intermediate bitmaps in an opposite order in which the series of intermediate bitmaps were calculated to obtain a plurality of intermediate layers; wherein
    the step of calculating the series of intermediate bitmaps includes using an alternate sequence of a first spread function and a second spread function that is different from the first spread function.

2. The method according to claim 1, wherein the first spread function includes:
    generating next to each pixel that corresponds to printing ink in the series of intermediate bitmaps an additional pixel for printing ink in four directions corresponding to an XY grid of the previous intermediate bitmap.

3. The method according to claim 1, wherein the second spread function includes:
    generating next to each pixel that corresponds to printing ink in the series of intermediate bitmaps an additional pixel for printing ink in four directions corresponding to an XY grid of the next intermediate bitmap and in four directions diagonal to the XY grid.

4. The method according to claim 2, wherein the second spread function includes:
    generating next to each pixel that corresponds to printing ink in the series of intermediate bitmaps an additional pixel for printing ink in four directions corresponding to an XY grid of the next intermediate bitmap and in four directions diagonal to the XY grid.

5. The method according to the claim 1, wherein a previous intermediate layer is cured before a next intermediate layer is printed.

6. The method according to the claim 2, wherein a previous intermediate layer is cured before a next intermediate layer is printed.

7. The method according to the claim 3, wherein a previous intermediate layer is cured before a next intermediate layer is printed.

8. The method according to the claim 4, wherein a previous intermediate layer is cured before a next intermediate layer is printed.

* * * * *